US008761125B2

(12) United States Patent
Lea

(10) Patent No.: US 8,761,125 B2
(45) Date of Patent: Jun. 24, 2014

(54) SCALABLE WIRELESS MESH NETWORKS

(75) Inventor: Chin Tau Lea, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 1659 days.

(21) Appl. No.: 11/743,124

(22) Filed: May 1, 2007

(65) Prior Publication Data
US 2007/0297371 A1 Dec. 27, 2007

Related U.S. Application Data

(60) Provisional application No. 60/795,902, filed on May 1, 2006.

(51) Int. Cl.
*H04W 4/00* (2009.01)
(52) U.S. Cl.
USPC ........................................... 370/334; 455/446
(58) Field of Classification Search
USPC ................... 370/331–334, 310.2, 328, 338; 455/404.2, 456.1–457, 422.1, 446, 455/448, 25, 63.5
See application file for complete search history.

(56) References Cited

U.S. PATENT DOCUMENTS

| 4,355,411 | A | * | 10/1982 | Reudink et al. | 455/437 |
| 5,657,374 | A | * | 8/1997 | Russell et al. | 370/328 |
| 6,798,765 | B2 | * | 9/2004 | Larsson | 370/351 |
| 7,415,278 | B2 | * | 8/2008 | Zhao et al. | 455/447 |
| 2002/0006798 | A1 | * | 1/2002 | Jaenecke et al. | 455/446 |
| 2004/0114546 | A1 | * | 6/2004 | Seshadri et al. | 370/310.2 |
| 2005/0210157 | A1 | * | 9/2005 | Sakoda | 709/251 |
| 2005/0271006 | A1 | * | 12/2005 | Chari et al. | 370/329 |
| 2006/0146718 | A1 | * | 7/2006 | Yarvis et al. | 370/238 |
| 2006/0215605 | A1 | * | 9/2006 | Srikrishna et al. | 370/329 |
| 2006/0268791 | A1 | * | 11/2006 | Cheng et al. | 370/338 |

* cited by examiner

*Primary Examiner* — Ajit Patel
(74) *Attorney, Agent, or Firm* — Amin, Turocy & Watson, LLP

(57) ABSTRACT

Multi-hop architectures of a wireless mesh network (WMN) compatible with the existing WiFi devices and potentially offering a much larger total capacity than a single-hop WiFi cell. The proposed architectures are scalable and do not have the hidden-terminal and the exposed-terminal problems intrinsic in a multi-hop environment that limited the space reuse efficiency of a WMN. The various disclosed architectures also support a fast and efficient location tracking scheme and can overcome the low space reuse efficiency in many of the existing WMN architectures.

23 Claims, 11 Drawing Sheets

• : 3-sector antenna

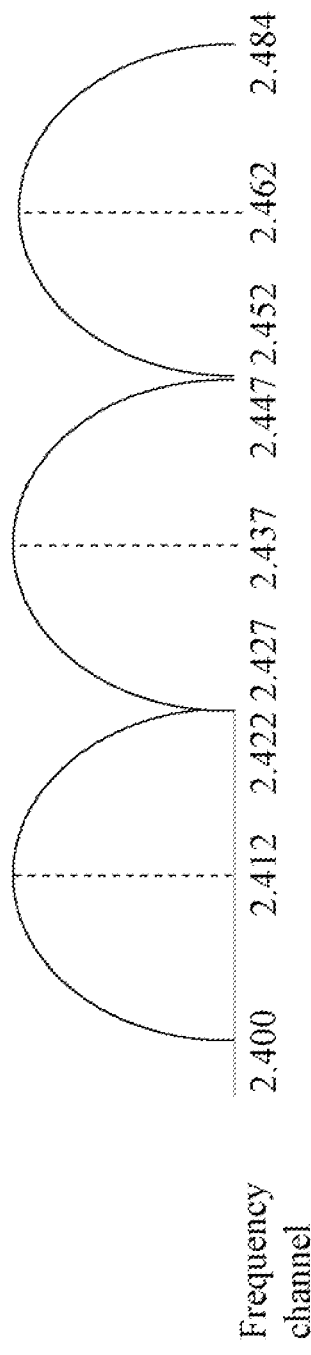

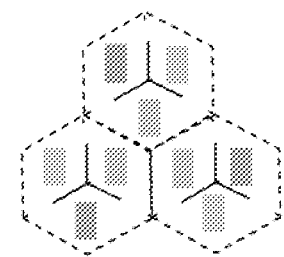
Figure 5A
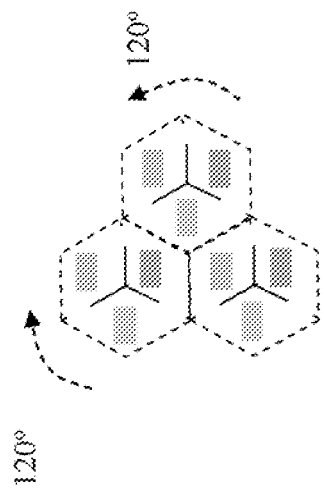
Figure 5B

Figure 6

| IAPID (8 bits) | MAC Address | Valid Bit |
|---|---|---|
| 0 | 1F-2C-00-3E-80-22 | 1 |
| 1 | .. | 0 |
| 2 | 01-0D-60-3E-BD-20 | 1 |
| 3 | 30-23-45-E2-98-00 | 1 |
| .. | .. | .. |
| 255 | | |

Figure 8A

| MAC address of a mobile client (6 bytes) | MAC address of its CAP |
|---|---|

Figure 8B

| MAC addresses of the mobile clients anchored here | MAC address of its CAP (valid if only relay bit is set) |
|---|---|

Figure 8C

| Visiting mobile client MAC addresses | Moved bit (1 bit) | New MAC address (valid if only relay bit is set) |
|---|---|---|

*Conventional Channel and Spatial Allocation*

● : 3-sector antenna

SCALABLE WIRELESS MESH NETWORKS

BACKGROUND AND SUMMARY OF THE INVENTION

The present application relates to a network architectures design, and more particularly to infrastructure wireless mesh networks with location tracking.

Background: Wireless Mesh Networks

There are two types of Wireless Mesh Networks (WMNs): infrastructure and ad hoc. This application focuses on infrastructure WMNs, which most enterprise applications will be based on. FIG. 2 shows an infrastructure WMN which consists of meshed access points (APs) and clients. APs' locations are fixed (not moving), but clients are mobile. The goal of a multi-hop WMN is to extend the 802.11 wireless LAN services to a much larger area without installing LAN cabling and other network infrastructures.

Unfortunately, a WMN has an intrinsic hidden- and exposed-terminal problem in a multi-hop environment which limits the scalability of the network. The RTS (Request-To-Send)/CTS (Clear-To-Send) collision avoidance method adopted by the 802 is believed to be ineffective in a multi-hop environment. It leads to a very low space reuse factor in a multi-hop environment.

The RTS/CTS efficiency is dominated by the following parameters.

$R_t$: Transmission range.

$R_i$: Interference range: the range within which stations in receive mode will be interfered by other transmitters and thus suffer a loss.

$R_s$: Carrier sense range: the range within which the power from the transmitter can be sensed, indicating the busy state of the medium.

The relationship among these parameters is very complicated in real applications. For example, $R_i$ depends on the distance between the sender and the receiver and its value varies for each transmission. The complicated relationship among these parameters explains why the RTS/CTS handshake cannot solve the hidden-terminal problem, nor the exposed-terminal problem.

FIG. 3A shows the Hidden-terminal Problem. In this example, A sends a packet to B, and C is outside the transmission range of B, but within the interference range. RTS/CTS cannot prevent a collision caused by transmissions from A and C. FIG. 3B shows the Exposed-Terminal Problem. In this example, B sends a packet to A, and later C intends to send a packet to D. Because B sends out a RTS and C receives it. So C will defer its transmission even though C can sends a packet to D which will not cause a collision (C is exposed from B—Inefficiency).

Several approaches have been proposed to improve the space re-use efficiency of the RTS/CTS scheme. One is to add two tones to the scheme—one controls transmission and one controls receiving The RTS/CTS controls both transmission and receiving channels). Another approach involves the use of power control. Yet another approach uses directional antennas, where every wireless node uses multiple antennas, each "tuned" to a specific portion (cone) of the three-dimensional space. Others have been proposed to dynamically adjust the $R_s$ (sensing range) or $R_t$ (transmission range). All these schemes share some common problems: (1) they add a significant complexity to the protocol, (2) it is difficult to make them compatible with 802.11 existing devices, and (3) it is unclear how effective they are in a real implementation because of the complicated relationship between $R_t$ (transmission range), $R_i$ (interference range) and $R_s$ (sensing range).

Scalable Wireless Mesh Networks

The present application provides new methods to design scalable WMN networks. In various embodiments, a frequency planning scheme deploys orthogonal frequencies indefinitely for adjacent cells and consequently no interference occurs. Also, the proposed mobility tracking scheme requires no central database and can easily locate a mobile user in a network.

The disclosed inventions, in various embodiments, can provide some or all of the following advantages, among other:

Wireless Mesh Networks can avoid most of the hidden and exposed terminal problems of 802.11-based WMN networks, and offer a much higher capacity;

Wireless Mesh networks networks are compatible with existing WiFi devices.

A frequency planning scheme which generates no interference among adjacent cells.

A mobility tracking scheme does not require a central database and therefore is scalable.

The proposed architectures will not interrupt on-going flows in a network.

The proposed architectures offer transparent layer-2 interconnects and handoffs.

The proposed architectures support both unicast and broadcast, and

The proposed architectures make no assumptions about higher layers and can work with any layer-3 protocols.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 3 illustrates some network problems existed in prior arts.

FIG. 4 shows a schematic representation of non-overlapping Wi-Fi channels (1,6,11) in 802.11 spectrum.

FIGS. 5A-5C shows a schematic representation of the proposed architecture. FIG. 5A shows a conventional frequency planning scheme. FIG. 5B shows a sample embodiment where the orientation of the neighboring cells is rotated in a specific way, to result in a quite different frequency planning scheme from that of FIG. 5A. FIG. 5C schematically shows an overview of the network according to FIG. 5B.

FIG. 6 shows an example of an IAPID Table where the AP with IAPID=1 failed and has been removed from the network.

FIGS. 8A-8C show examples of entry format in various location tables. FIG. 8A shows a sample format of an entry in the LC_NAC, FIG. 8B shows a sample format of an entry in the LC_AC, and FIG. 8C shows a sample format of an entry in the ACC.

Figure 1:
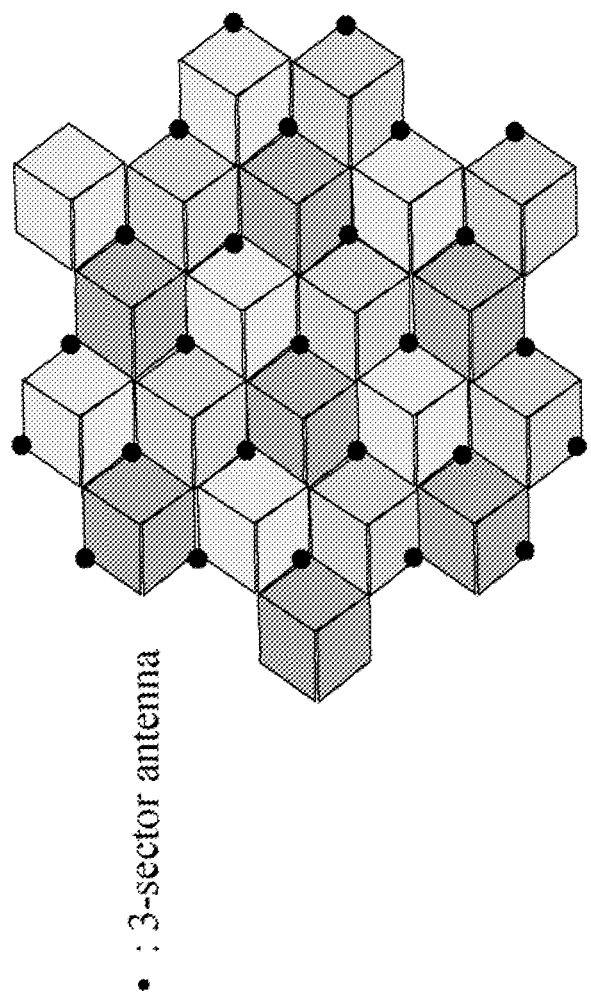
FIG. 1 shows a schematic representation of an example wireless mesh network based on the proposed approach.
Figure 2:
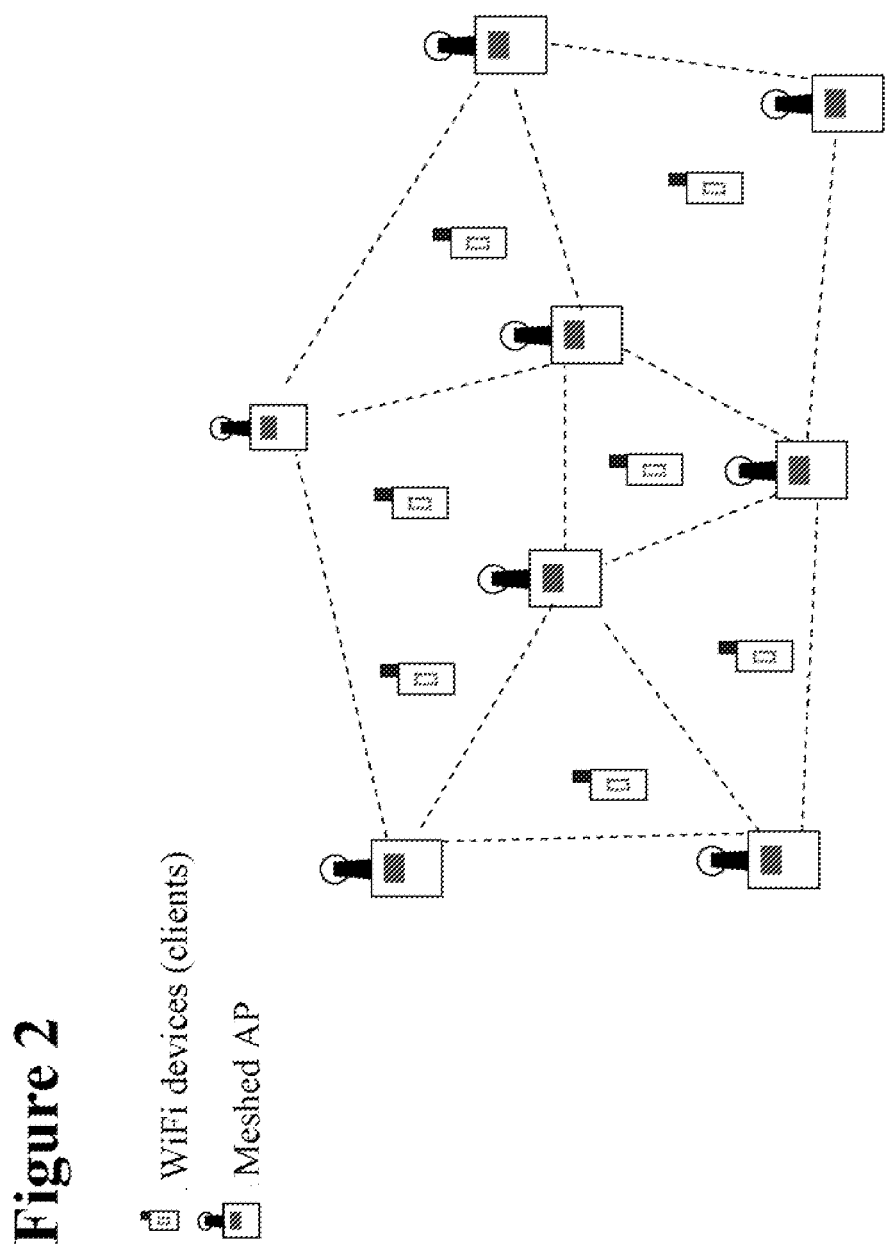
FIG. 2 shows a schematic representation of a wireless mesh network in general.
Figure 3A:
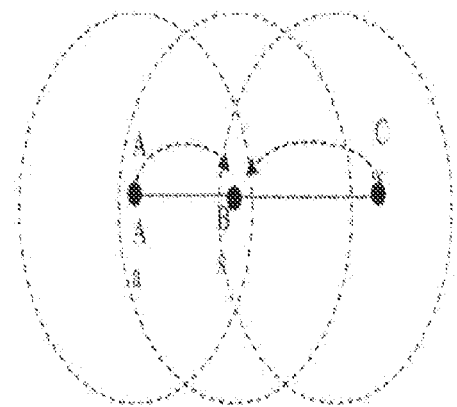
FIG. 3A shows a schematic representation explaining hidden terminal problem.
Figure 3B:
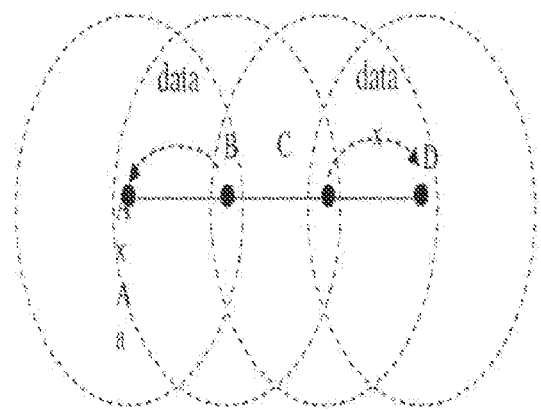
FIG. 3B shows a schematic representation explaining exposed terminal problem.

This figure can be compared with FIG. 1 to show the very important differences in topology.

DETAILED DESCRIPTION OF THE PREFERRED EMBODIMENTS

The numerous innovative teachings of the present application will be described with particular reference to the presently preferred embodiment (by way of example, and not of limitation).

Frequency Planning

There are multiple Wi-Fi channels for APs to select, and in fact neighboring APs can select different channels in the spectrum of 802.11b,g. However, for ease of discussion purpose only, this application describes the preferred embodiment by using the following three channels: channel 1, 6, and 11, for APs. Note that the selection of channels used in this description in no way limits the use of other channels or other number of channels in other embodiments.

FIG. 4 illustrates the channel selection discussed here. These three channels have non-overlapping spectrums. Each AP is equipped with a 3-sector antenna and each sector uses one of the three selected channels. Mobile client devices, however, still use omni-directional antennas.

Figure 5C:
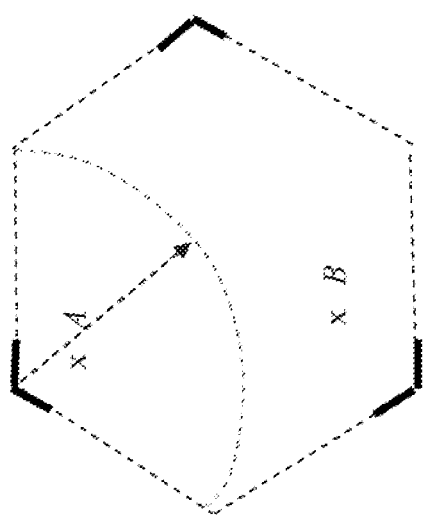

Suppose that the access points are laid out in a honeycomb pattern. Thus each AP is located in the center of a hexagon cell (the shape does not need to be precise), and each cell has 6 neighbors. FIG. 5A shows a conventional frequency planning. FIG. 5B shows a preferred embodiment where the orientation of the neighboring cells is rotated in a specific way and a different frequency planning is given. Note that this new frequency planning is not used in TDMA and analog based cellular networks because of the co-channel interference it generates. In the preferred embodiment the area surrounded by three APs is considered as a new cell, and each new cell will use the same frequency. The result is a network shown in FIG. 1 that has the following properties:

1. Each cell (new cell) has three APs located at the three corners of the cell. At any time, a client is associated with only one of the three APs (the association process is defined in 802.11). Transmissions within a cell will use the same frequency. RTS/CTS signals from neighboring cells use different frequencies and is ignored.
2. In AP-to-Client and Client-to-AP transmission, RTSs are sent by clients and CTSs are sent by APs. The transmission range ($R_t$) will be set to r—the radius of the cell—in both cases.
3. In AP-to-AP transmission, the transmission range will be set to about $\sqrt{3}r$—the distance between two APs.

The architecture described above does not have the hidden-terminal and the exposed-terminal problems. Consider an example in FIG. 5C. Assume that A is sending data to its associated AP. If A is in the middle of the cell, then the RTS signal can be received anywhere in the cell (recall that the transmission range is r). If A is closed to the top AP and B is not within the transmission range, B may sense but cannot receive the RTS signal. So B will send before the virtual timer indicated by the CTS signal expires. However, B's transmission in this case will not corrupt A's transmission because B is outside the interference range. Neither the hidden nor the exposed terminal problems exist in the architecture described in the preferred embodiment.

This architecture is also compatible with the existing WiFi clients as no changes are required for the client side. A channel can be re-used after a distance r. This space reuse factor is much smaller than that can be achieved in a conventional WMN.

Figure 10:
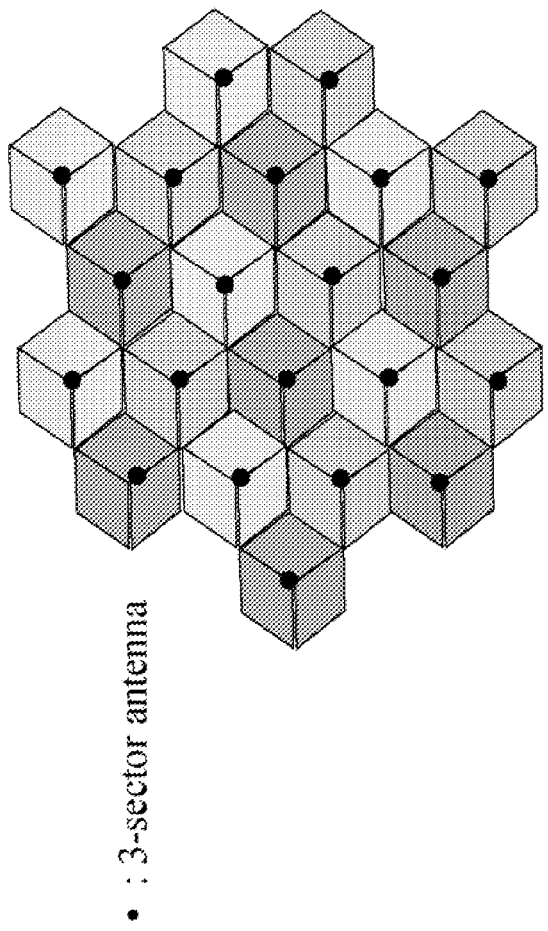
FIG. 10 schematically shows spatial and channel allocation in a conventional network scheme, e.g. a cell phone network.

FIG. 10 schematically shows spatial and channel allocation in a conventional network scheme, e.g. a cell phone network. This figure can be compared with FIG. 1 to show the very important differences in topology. Note that the conventional architecture of FIG. 10 forbids channel sharing between adjacent access points, while the new architecture of FIG. 1 requires it. Even though FIG. 10 may look similar to FIG. 1, the change in the locations of the access points has very important consequences. The plan of FIG. 1 is generally unsuitable for systems which use the plan of FIG. 10, and vice versa.

Mobility Tracking

In the preferred embodiment, each mobile client is associated with one AP in order to use the service of the network. The location of a mobile client in the current embodiment is referred by the MAC address of its currently associated AP. There are two main components in the current embodiment: a routing scheme and a fast location tracking scheme. Traditionally in a WMN, the interconnection is done at layer 2 and broadcast will only be used for broadcast packets. The preferred embodiment uses MAC-layer unicast routing. In come classes of embodiments, Shortest-path routing protocols, such as OSPF or IS-IS used in layer-3 networks, can be adapted for our layer-2 multi-hop network, and the new network will use flooding for broadcast traffic wherein hop-count is used for controlling the flood. Other class of embodiments can also use a spanning tree to perform the multicast. At any rate, mobile clients will not notice any difference and still thin they are connected to a single-hop broadcast layer-2 AP.

In the preferred embodiment for location tracking, each mobile client is assigned an Anchor AP (AAP) in which the location information of the mobile client is anchored. When a user moves from one AP to another, the new AP will send a location update to the AAP of the mobile client. The current embodiment designs a simple AAP assignment scheme such that an AP can easily figure out the AAP of any mobile client. The AAP assignment scheme also considers load balancing and fast error recovery.

AAP and IAPID Binding

In the preferred embodiment, each AP is assigned an 8-bit internal ID number, called Internal AP ID (IAPID). The IAPID, ranging from 0 to 255, is assigned consecutively when the network is booted up. The IAPID is used to access a table, called the IAPID Table, which stores the mapping between an AP's MAC address and IAPID. When a new AP is added to the network, the new AP can learn the IAPID Table from its neighbors through the routing protocol. The new AP will assign itself the next available IAPID and broadcast that information to all the other APs. In another class of embodiments, the assignment task can also be delegated to the active AP with the lowest IAPID (normally, it is IAPID=0 if no failures occur). There, the newly added AP, after learning the IAPID Table from its neighbors, will send a request to the delegated AP that will assign an IAPID to the new AP and broadcasts the information to the entire network.

There are two reasons for creating IAPID.

The first reason is for implementing the AAP assignment. Support the MAC address of a mobile client is x, the preferred embodiment then uses a hash function H(x) to produce a number between 0 and Max_IAPID, where Max_IAPID is the largest IAPID assigned. The MAC Address of the entry indexed by H(x) in the IAPID Table will be the AAP's MAC Address for this mobile client. The table size (Max_IAPID+1) determines how many APs can be used in the network. For example, if the table size if 256 and only have 20 APs are present, new APs can be added, but only up to a maximum number of 256, because of table size.) If Valid_Bit of that entry in the table is 0, the next valid entry after H(x) in the IAPID Table will be the AAP for mobile client x. When a new AP is added to the network, MAX_IAPID increments by one. As a result, the AAP of a mobile client will change. Similarly when an AP fails and is removed from the network, the AAP assignment will change as well.

The second reason for creating IAPID is to reduce the routing overhead. This will also be discussed in the next section.

Protocol Header

Figure 7:
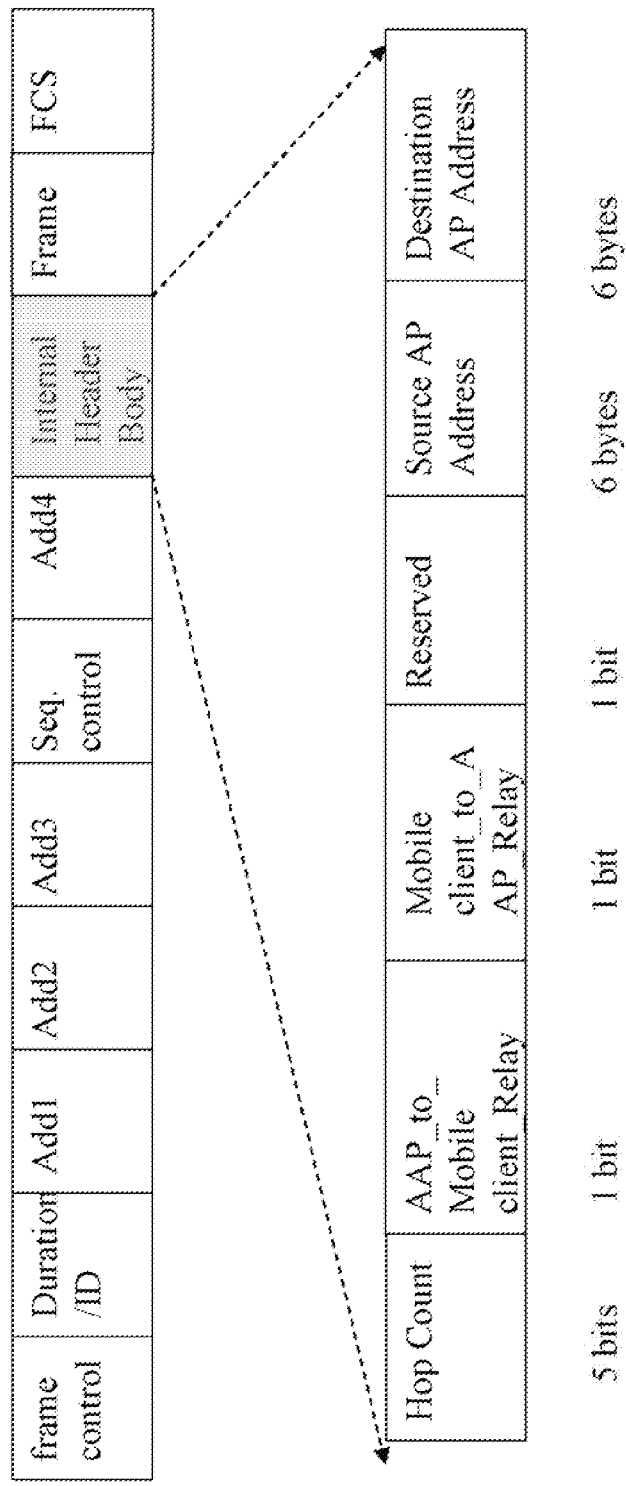
FIG. 7 shows an example of packet/frame format.

The format of IEEE 802.11 is frame illustrated in FIG. 7. In the preferred embodiment, an internal header will be added in the data field of the 802.11 standard. This means that the maximum packet (or frame) length in the proposed network will be shorter than the maximum length defined in 802.11. The internal header is used to route a packet from the source AP to the destination AP. In the discussion below, the Current AP (CAP) of a mobile client is the AP with which the mobile client is currently associated.

There are four addressed defined in the 802.11 standard:
(Add.1) Source mobile client's MAC address,
(Add.2) Destination mobile client's MAC address,
(Add.3) Sending AP's MAC address: the address of the AP that is sending the packet,
(Add.4) Receiving AP's MAC address: the receiving AP's MAC address.

In the preferred multi-hop ad-hoc network, there are two additional addresses for routing a packet:
(Add.5) MAC address of Source AP: the MAC address of the CAP of the source mobile client.
(Add.6) MAC address of Destination AP: the MAC address of the CAP of the destination mobile client.

(Add.3) and (Add.4) change as a packet is forwarded hop by hop; (Add.1-Add.2) and (Add.5-Add.6) do not. (Add.5) and (Add.6) are located in the internal header. This means that the maximum packet length in the proposed WMN will be shorter than the maximum defined by the 802.11 standard. The internal header also has a hop count which decrements on each hop. When the packet's hop count=0, the AP will throw it away. The hop count is to prevent overflow in multicast and temporary looping in routing.

Packet Forwarding

Main Tables

The proposed architecture in the current preferred embodiment uses several tables to implement routing, forwarding, and location tracking. Recall that the location information of a mobile client is anchored in the AAP of the mobile client. Each AP will have the following tables:

Routing Table stores the next hop information for a particular AP. A standard shortest path routing algorithm can be used.

Location Cache for Anchored Clients (LC_AC) stores the locations of the AP's anchored mobile clients.

Location Cache for Non-Anchored Clients (LC_NAC) stores the locations of the AP's non-anchored mobile clients. This information is learned from the AAPs of packets originated from this AP.

Associated Client Cache (ACC) stores the MAC addresses of the mobile clients currently associated with the AP.

FIGS. 8A-8C illustrate examples of the entries in tables introduced above. The preferred embodiment choose to implement all tables as hash tables and selecting the hash function for each table is, even though important, not the focus of this application, but should be obvious to one with ordinary skills in the art. Also, in the preferred embodiment the information in all three tables is soft-state, meaning that their contents will be flushed periodically.

Roaming and Re-Association

After a mobile client is powered on, it goes through the association process with an AP. Association makes a logical connection between a mobile client and an AP. In addition to the regular tasks specified by the IEEE 802.11 standard, the CAP of the mobile client in the preferred embodiment will do one more thing: sending a location update to the AAP of the mobile client.

When a mobile client moves into a new cell, it will go through the re-association process. The mobile client, according to the 802.11 standard, will inform the new CAP about the address of the previously associated AP and the new CAP will inform the previously associated AP to disassociate the connection. The preferred embodiment performs two additional tasks. First, the new CAP also needs to inform the AAP of the new location and the AAP will update its ACC table. Second, the previously associated AP will not disassociate with the mobile client immediately, and a relay pointer will be set up in the ACC Table to forward packets for the mobile client for a certain period. This is to maintain seamless handoff.

Packet Forwarding

Figure 9:
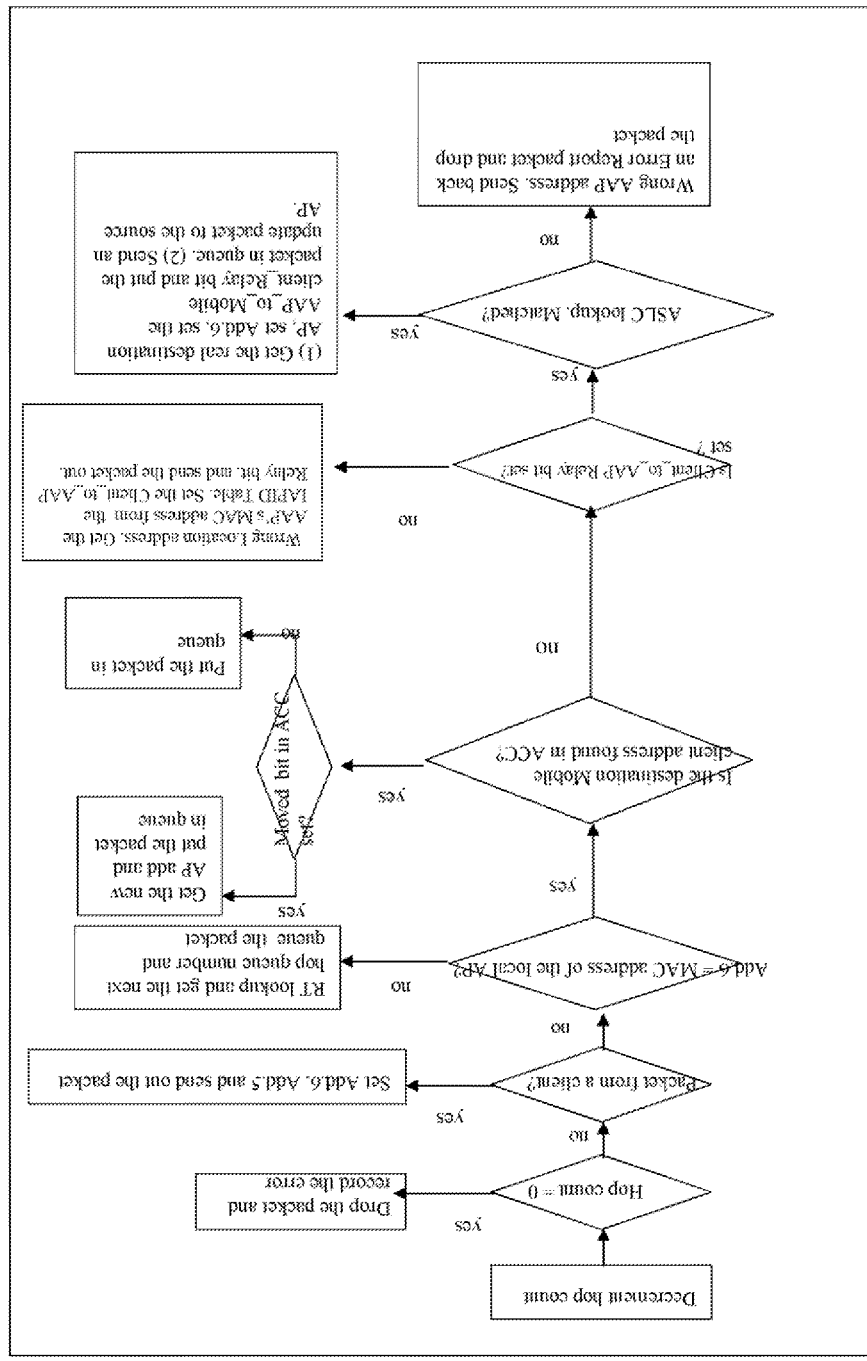
FIG. 9 shows an example of the forwarding procedure for packets received from another AP.

When a packet arrives, the forwarding procedure defined in the preferred embodiment depends on whether it is from a client, or an AP. FIG. 9 shows an example of a forwarding procedure in the preferred embodiment.

(A) When an AP receives a packet originated from its associated client, the AP uses the ACC to decide if the destination client is an associated mobile client. If so, the packet will be sent to the destination without much processing (To_DS bit will be re-set). If not, it will access LC_AC (or the LC_NAC if the AP is not the AAP of the client) to retrieve the address for Add.6. It then lookups the routing table to determine Add.4. Put its own address in Add.5 and Add.3 and send it out.

If the Add.6 is not in the LC_AC (or LC_NAC), the AP will put the MAC address of the AAP into Add.6. Set the Client_to_AAP_Relay bit, and sends it to the AAP of the packet. Alternatively, the AP can buffer the packets and sends a location update request to the AAP of the client. When location information arrives, the packets will then be forwarded. Although out-of-sequence transmissions do not happen, a separate queue needs to be allocated for buffering all sub-sequent packets.

(B) When an AP receives a packet from another AP, it first determines if the packet has reached the destination by comparing the Add.6 with its own MAC address. If not, the AP will access the routing table and forward the packet to the next hop. If yes, there are two possibilities: 1) the local AP is the AAP of the packet and the packet is sent by its CAP that does not know the real destination of the packet (the Client_to_AAP_Relay bit is set). The local AP will (a) send back a location update to the CAP of the source (Add.5), (b) retrieve the CAP address of the destination client and put it in the field of Add.6, (c) set the AAP_to_Client_Relay bit and transmit the packet.

2) If Client_to_AAP_Relay bit is not set, the local AAP will check if the Add.2 is in its ACC. If yes, it sends out the packet to Add.2 (or sends the packet to the new CAP if the Moved Bit in the ACC table is set). If not, this is an error. So the packet should be sent to the AAP for relay. But if the AAP_to_Client_Relay bit is already set, then the packet has been forwarded from its AAP. (meaning the information in the AAP of the packet is not up to date either). The packet should be dropped because sending it back to the AAP will cause looping (this problem is due to non-up-to-date information in the AAP).

Control Packets and Timers
  Control Packets
  The preferred embodiment requires control packet exchanges between two APs to handle normal and exceptional cases. For example, location updates are sent from an AP to an AAP, and if the AAP does not find the information in its LC_AC, it sends an error report control packet back. In addition to those defined in the IEEE 802.11 standard, some of the major ones are listed below.
  Hello: Initialization packets (broadcast).
  Route Update: link state updates, broadcast periodically to update the topology of the network (broadcast).
  Location Update Request: Sent from an AP to an AAP (unicast).
  Location Update Response: Sent from an AAP to an AP (unicast).
  LC_AC Update: from an AP to AAPs (unicast).
  Error Report: Report an error from an AP to an AAP (unicast).
  Timers
  There are timers associated with each Table in the preferred embodiment.
LC_NAC Timer:
  This timer is associated with each entry in the LC_NAC table. When the LC_NAC timer expires, the corresponding entry is removed.
LC_AC Timer:
  An LC_AC entry is removed when its LC_AC timer times out. This occurs when no updates are received about the location of an anchored client. Note that even if a client stays in an AP for a longer period, location updates are still sent to the AAP because the CAP's tables are flushed out periodically. After that, when a packet is received from a client (even if it stays there for a long while), updates will be sent to the AAP.
ACC Flushing Timer:
  The ACC contents are flushed periodically. This timer determines the period.
AP_Relay Timer:
  Determine how long an AP needs to relay packets after a client moves into a new AP.
LC_AC_Switching:
  When a new AP joins the network, the assignment of AAP will change. To maintain a seamless network, two LC_AC tables are set up temporarily, and this timer determines when to switch to the new LC_AC table.
  These timers have to be set correctly as they will affect the performance and packet loss rate of the system. If the LC_AC Timer is set too long, its information will stale and packets may be sent to a wrong AP. When a client moves out, an AP needs to forward packets for the client for the duration specified by AP_Relay Timer. To prevent packets forwarded to wrong APs, the timers should be set based on the following two conditions:

AP_Relay Timer>LC_NAC Timer.

and

LC_AC Timer>ACC Timer

When a new AP is added to the network, Max_IAPID increments by one. The AAP assigned to a particular mobile client will change. To handle the situation, each AAP can have two LC_AC tables, denoted by LC_AC_Current and LC_AC_ New. When un update packet to add a new AP is received, an AP will start the LC_AC_Switching_Timer. Before the timer expires, there will be two AAPs assigned to every client, denoted by AAP_Current and AAP_New. Location update packets will be sent to both AAPs. (We also need two registers Max_IAPID_Current, and Max_IAPID_New to store the maximum index value which determines the AAP value for each client.) When the LC_AC_Switching_Timer expires, an AAP will change the LC_AC_New as the LC_AC_Current.
  Note that is possible before LC_AC_Switching_Timer expires, another AP is added to the network. When this happens, simply reset the timer and delete the content of LC_AC_ New and rebuild it again. Based on the discussions above, the timers should be set based on the condition:

LC_AC_Switching_Timer>LC_AC_Timer.

The length of the LC_AC_Switching_Timer should also consider the delay jitter of the network. Similarly when a node fails, the corresponding entry in the IAPID Table will be marked invalid. In this case the MAX_IAPID does not change and the network will use the next valid entry as the new AAP for a MAC address. The only problem will be that before the IAPID Table is updated, some location information will be lost. In another class of embodiments that will make the network fault tolerant in this situation, an AP should always send a copy of its LC_AC table to its successor AP in the IAPID Table.
  According to various disclosed embodiments, there is provided: A wireless network, comprising: a plurality of access points; individual ones of said access points being configured to communicate (a) with any compatible mobile station which may be in proximity thereto, and also (b) with adjacent other ones of said access points, using a common wireless channel allocation for both (a) and (b).
  According to various disclosed embodiments, there is provided: A wireless network, comprising: a plurality of assigned-channel zones, each formed by an access point with directional antenna located at a corner of said zone; and at least one cell covered by multiple ones of said zones with access point corners of said zones spaced around the borders of said cell; wherein all said multiple zones within a single cell use a common channel allocation; and wherein all cells adjacent to said cell use a different channel allocation.
  According to various disclosed embodiments, there is provided: A wireless network, comprising: at least two adjacent access points, at least one client terminal, and an additional access point, identified in dependence on the address information of said client terminal, which is designated as an anchor access point for said client terminal; wherein said adjacent access points use a common channel for communicating with each other and with said client terminal; wherein at least one said access point updates the current location information of said client to said anchor access point; and where said anchor access point provides routing for data packets destined for said client terminal; whereby the frequency plans deployed in the network generate no hidden terminal nor exposed terminal problems.
  According to various disclosed embodiments, there is provided: A system for location tracking in a network, comprising: a distributed registration repository which is updated by a network node whenever a client terminal is associated or re-associated with said network node, and a lookup procedure which is invoked by a network node, when a request for the location of said client terminal is received, to request said distributed registration repository for location information of said client, wherein the identity of said distributed registration repository is dependent upon the address information of said client terminal.
  According to various disclosed embodiments, there is provided: A method for wireless communications, comprising the steps of: in an infrastructure wireless mesh network, using a shared channel assignment for adjacent pairs of access points and also for mobile users therebetween; when a client terminal is associated or re-associated with an access point, registering that client terminal's location information with a respective anchor access point; and routing a packet to said client terminal by requesting said respective anchor access point for location information of said client; whereby said network has no hidden terminal or exposed terminal problems.

According to various disclosed embodiments, there is provided: A method for operating a wireless mesh network, comprising: a) communicating between adjacent pairs of access points, and also b) communicating with any compatible mobile station which may be in proximity thereto, using a common wireless channel allocation for both a) and b).

According to various disclosed embodiments, there is provided: a multi-hop architecture for a wireless mesh network (WMN), which is compatible with the existing WiFi devices, and which potentially offers a much larger total capacity than a single-hop WiFi cell. The proposed architectures are scalable and do not have the hidden-terminal and the exposed-terminal problems intrinsic in a multi-hop environment that limited the space reuse efficiency of a WMN. They also support a fast and efficient location tracking scheme and can overcome the low space reuse efficiency in many of the existing WMN architectures.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. The variations indicated above are just a few examples; following are some additional examples, but many others are possible.

For example, the preferred embodiment uses channels 1, 6, and 11 defined in 802.11, but other embodiments can make use of different three channels. Further, one skilled in the art should be able to apply the disclosed approach to different number of channels, say six channels instead of three, such that each sector would be assigned two channels instead of only one.

For another example, the preferred embodiment utilizes 3-sectorization, but alternatively a 6-sectorization can be deployed such that each zone is composed of six directional antennas instead of original three. In this case frequency planning will be more complicated, as we need to keep the neighboring zones's frequencies non-overlapping (orthogonal). 3-sectored systems are the most commonly used system in the field.

Yet another example would be the application of the location tracking system to non-wireless environment. The disclosed approach can be applied to a wire-lined network without much change. For example, when dense APs are deployed in a building, we can use the same location tracking scheme as discussed in the patent to track the location of a moving user or packages. This system can serve as an indoor supplement to a GPS system. Even when a device is blocked from communicating with any GPS satellite, its location can still be tracked as long as it is able to access a network.

In an alternative embodiment, it is contemplated that layer-3 routing can be used instead of layer-2 routing as above. This embodiment provides compatibility with 802.11. However, if an internal header is added, this may cause incompatibility with the current 802.11's MAC layer. It is also expected that future updates to 802.11 will permit the type of routing described above. In that case, we can remove the internal header and make the protocol entirely compatible with the new 802.11s standard.

It should be noted that the common channel allocation between adjacent access points can be implemented not only by different frequency assignments, as described above, but also by orthogonal coding (possibly in combination with frequency diversity), or (less preferably) by time-division or other techniques in combination with the above.

For another example, it is not strictly necessary to use RTS/CTS handshaking within a common channel allocation. Subject to compatibility requirements, more complex schemes, or none, can be used instead.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An access point device, comprising:
a memory to store instructions; and
a processor, coupled to the memory, that executes or facilitates execution of the instructions to perform operations, comprising:
    sending, using a first directional antenna corresponding to a first corner of a first assigned channel zone of a cell representing a defined geographical area, first data to a mobile station device using a wireless channel allocation; and
    sending, using the first directional antenna, second data to a remote access point device corresponding to a second corner of a second assigned channel zone of the cell using the wireless channel allocation.

2. The access point device of claim 1, wherein the first directional antenna corresponds to a radiation pattern of 120 degrees.

3. The access point device of claim 1, wherein the mobile station device is an Institute of Electrical and Electronics Engineers (IEEE) 802.11 physical-layer compatible device.

4. The access point device of claim 1, wherein the first directional antenna is an Institute of Electrical and Electronics Engineers (IEEE) 802.11 compatible device.

5. The access point device of claim 1, wherein the first directional antenna is an infrastructure-mode wireless mesh network compatible device.

6. The access point device of claim 1, wherein a transmit range of the mobile station device has been set to no more than a distance between the access point device and the remote access point device.

7. The access point device of claim 1, wherein the mobile station device deploys a request-to-send (RTS)/clear-to-send (CTS) scheme before communicating with the access point device.

8. A wireless system, comprising:
a memory to store instructions; and
a processor, coupled to the memory, that executes or facilitates execution of the instructions to perform operations, comprising:
    sending, by a directional antenna located a first corner of a first assigned-channel zone of a cell representing a defined geographical region, first information directed to an access point device corresponding to a second corner of a second assigned-channel zone of the cell using a common wireless channel allocation; and sending, by the directional antenna, second information directed to a mobile device using the common wireless channel allocation.

9. The wireless system of claim 8, wherein the directional antenna corresponds to a radiation pattern of approximately 120 degrees.

10. The wireless system of claim 8, wherein the common channel allocation is based on an Institute of Electrical and Electronics Engineers (IEEE) 802.11 infrastructure.

11. The wireless system of claim 8, wherein the cell comprises a third assigned-channel zone.

12. The access point device of claim 1, wherein the directional antenna has been rotated with respect to an orientation of the remote access point device.

13. The wireless system of claim 8, wherein the cell comprises six assigned-channel zones comprising the first assigned-channel zone and the second assigned-channel zone.

14. A method comprising:
sending, by a first access point device comprising a processor using a common wireless communication channel allocation via a directional antenna located at a first corner of a first assigned channel zone of a cell representing a defined region, first data to a mobile device; and sending, by the first access point device using the common wireless communication channel allocation via the directional antenna, second data to a second access point device corresponding to a second corner of a second assigned channel zone of the cell.

15. The method of claim 14, further comprising:
sending, by the first access point device using a wireless communication channel allocation different from the common wireless communication channel allocation, third data to a third access point device corresponding to another cell that is adjacent to the cell.

16. The method of claim 14, wherein the directional antenna comprises a radiation pattern of approximately 120 degrees.

17. The wireless system of claim 8, wherein the first assigned-channel zone and the second assigned-channel zone are spaced around a border of the cell.

18. The wireless system of claim 8, wherein another cell adjacent to the cell uses another channel allocation different from the common wireless channel allocation.

19. The access point device of claim 1, wherein the operations further comprise:
sending third data to a third access point device of the cell using the wireless channel allocation.

20. The wireless system of claim 8, wherein the cell comprises a third assigned-channel zone comprising another access point device located at a third corner of the third assigned-channel zone, wherein the third access point device has been configured to communicate with the first access point device and the mobile device using the common wireless channel allocation.

21. The method of claim 14, further comprising:
sending, by the first access point device using the common wireless communication channel allocation, third data to a third access point device.

22. The access point device of claim 1, further comprising:
a second directional antenna corresponding to a radiation pattern of 120 degrees and a defined frequency of an 802.11 electromagnetic spectrum; and
a third directional antenna corresponding to the radiation pattern and the defined frequency, wherein the first directional antenna corresponds to the radiation pattern and the defined frequency.

23. The access point device of claim 22, wherein the first directional antenna is located at a 0-degree corner of a hexagon, wherein the second directional antenna is located at a 120-degree corner of the hexagon, and wherein the third directional antenna is located at a 240-degree corner of the hexagon.

* * * * *